UNITED STATES PATENT OFFICE 1,928,781

COMMINUTED SHORTENING

Edward K. Chapin, Glen Ellyn, Ill., assignor to Kraft-Phenix Cheese Corporation, Chicago, Ill., a corporation of Delaware No Drawing. Application October 12, 1932
Serial No. 637,547

3 Claims. (Cl. 99—13)

The invention relates to improvements in comminuted shortening and has particular reference to the production of a substance normally in powder form which may serve as a substitute for the usual butter, lard, or other shortening as an ingredient in mixes or batches such as are employed in the baking of breads, biscuits, doughnuts, cakes and the like. This improved shortening, as an incident to its manufacture or production, may be combined with some other edible material which is a normal ingredient of the mix, for example, milk.

The advantages of employing a shortening ingredient in powder form are great. In the first place, a material in powder form may be mixed with the flour and other ingredients of the mix or batch with much greater facility than is possible by the use of a normally liquid oil or by the use of a semi-solid fat such as butter, lard or lard substitute. Other advantages will be apparent to those skilled in the art.

Hence, one object of the invention is to provide an improved comminuted shortening material which will be stable at ordinary temperatures and which may be incorporated into the bakery batch with practically the same facility as any other batch ingredient in powder form. Other objects of the invention are to provide a shortening powder which will not become rancid under normal conditions; to provide a material of this character so constituted that the addition of water or other aqueous fluid employed in converting the dry mix into paste or dough-form will, in effect, release the fat particles and render the same fully effective for their intended function in the mix; to provide a shortening powder which, in addition to the shortening ingredient also contains another ingredient of value in the mix; to provide an improved process for the production of said comminuted shortening, and in general, to provide an improved and efficient shortening and process for producing the same, of the general character referred to.

I am aware that some attempts have been made to produce from relatively cheap ingredients, a shortening in powder form. (I construe the term "shortening" as applying to an oleo-ferous or oil bearing materiol containing at least about 50% fat on a dry weight basis, i. e. excluding whatever moisture may be present in the material.) However, so far as I am aware, under the prior art, materials heretofore made or proposed by others, have possessed in insufficient degree the properties of stability, keeping quality, (including resistance to a tendency to become rancid) and property of readily releasing the fat content at the proper time, but not before the proper time.

I am also aware that attempts have been made by others to produce what is called "whole milk" powder by what may be termed a "reconstitution" method which consists in first removing the butter fat from milk, treating said butter fat to improve its keeping quality and restoring the treated butter fat to the milk before converting same into a dry powder. The product of such process is a milk powder which contains 28% or less fat and which is not usable as a shortening for general bakery purposes. I understand that shortenings of general application for bakery goods should contain between 50% and 90% of fat.

In developing a material to fulfill the above described objects, I recognized that to produce a commercial article, it was necessary to employ as the fat ingredient, a relatively cheap vegetable oil such as cotton seed oil. Otherwise, the article probably would be unable to compete with butter, lard or substitutes therefor unless my new material possessed some considerable advantages over shortening materials now available. I also recognized that such a material would have to be produced in the form of a dry emulsion, i. e. one in which the fat existed as tiny globules each enclosed in an envelope of material which would not only separate the globules of fat but would insulate them against access of air or other agencies which might have a tendency to unstabilize the emulsion, to make the oil become rancid, or otherwise to impair the keeping qualities of the material. Such enveloping material should also be of such character and so constituted as to have the property of rapid dispersion in aqueous fluid so as to quickly release the oil globules and render the latter available in the mix.

Numerous experiments were made with cottonseed oil, with casein as an envelope for the oil globules in the dry emulsion. In carrying out these experiments, I employed commercial casein which was dissolved in a water alkali solution. Also, instead of using commercial casein, I experimented with the use of ordinary skim milk which, of course, contains a preponderating percentage of casein. The oil was mixed with milk and the mixture homogenized and subsequently dried by the usual spray method which includes a preliminary condensing step in vacuum pans to reduce the load upon the spray drying equipment.

Although, in the experiments last referred to, I succeeded in producing a dry emulsion of oil in casein having the required fat content of 50% or more, the powder so produced, for some reason, did not have the properties which I had anticipated it to have and which are set forth in the list of objects above mentioned.

Upon continuing my experiments, I discovered that the deficiency or deficiencies of the material were due to deficiencies in the globule envelopes, i. e., the casein phase of the emulsion. However, not knowing of any other edible material which could be substituted for casein, I continued my experiments and made the further discovery that the heat application steps employed by me in desiccating the material according to the usual practice, had the effect of quite profoundly changing the chemical properties of the casein and also its physical properties as a colloid, so that the efficiency of the casein as a temporary envelope for the oil particles was materially impaired.

I then found that the desired properties could be obtained in large measure if I omitted the customary preliminary condensing steps usually employed in spray drying milk, although obviously this imposed upon the spray drying equipment the entire burden of desiccating the material. In applying the above principles I have successfully produced a product possessing all of the above listed desirable properties, an example of the process employing said principles being as follows:

*Example*

About 125 pounds in weight of liquid refined deodorized cottonseed oil are mixed with a batch of 1250 pounds of fluid skim milk of standard or normal composition. Preferably, these ingredients are heated together before they are mixed, preferably by direct injection of steam to avoid loss of water. In any case, during or subsequent to the mixing operation, the temperature of the mixture is raised to not more than 165 degrees so as not to denature the proteins. The purpose of heating the skim milk is to aid in adsorption of a casein film by the fat particles formed in the subsequent homogenizing step. It is my belief that this heating operation serves to condition the casein so as to improve its film-forming ability without substantially modifying its solubility or other natural properties. Obviously this step also serves the purpose of pasteurizing the material, i. e. killing deleterious organisms which might affect the material prior to the desiccating step. At this temperature and while the mixture is being vigorously agitated so as to prevent separation of the respective ingredients, the mixture is emulsified in an ordinary homogenizing apparatus, preferably at a pressure of about 2000 pounds per square inch, or in a colloid mill.

The homogenized mixture of fat and skim milk is then simultaneously atomized and dried in a Gray and Jensen or other suitable type of evaporating apparatus. Preferably, as an additional precaution, a certain amount of agitation is maintained in the tank which supplies the drier.

The oleo-ferrous powder made by this process is found to be practically free from all oiliness or gumminess when kept and handled under ordinary conditions of temperature and moisture and will be found to have a fat content of about 50%.

This new material possesses at least one highly advantageous property which will be appreciated by the baker or cake maker and which, so far as I am aware, is not possessed by any of the shortening materials now on the market. I refer to the fact that always in employing such materials as lard, butter, or other fats, oils, or greases, it is necessary to employ prolonged mechanical agitation of the mixture in order properly to incorporate the oily or greasy constituent with the other constituents which are in powder form. On the other hand, with the use of my improved material, the fact that it is in powder form enables it to be incorporated with the other ingredients by a simple sifting or mixing operation. This is quite effective to insure a thorough uniform dispersion of the fat throughout the mix.

The percentage of oil may be varied within wide limits. There appears to be no difficulty in making, according to this general method, a product having a fat oil content of as high as 90% which is a desirable percentage for the manufacture of a shortening powder suitable for the baking of cakes, and in which only a relatively small percentage of milk constituents should be used.

The word "fat" as used in the claims is intended to include both liquid and solid fats.

I claim as my invention:

1. The improvement in the process of making a dry comminuted shortening material which consists in adding to an edible oil, milk of normal moisture content and in an amount not enough to reduce the fat content below about 50 per cent of the total amount of non-aqueous material, but enough to effect proper emulsification, mixing the ingredients, heating the same to a pasteurizing temperature, emulsifying the mixture, during all of which preceding steps of the treatment the original moisture content is maintained, and then atomizing and quickly removing the moisture from said material to produce a shortening material in the form of a dry oleo-ferous powder containing at least about 50 per cent fat, the fat being in the form of minute globules each enclosed in an envelope of casein which has substantially the same chemical properties as the casein of normal milk but of improved film-forming properties, and which serves to protect the fat from deteriorative agencies while being readily soluble so that the fat is quickly released upon the addition of water to the material.

2. The improvement in the process of making a dry comminuted shortening material which consists in adding to an edible oil a milk of normal moisture content in an amount insufficient to reduce the fat content below about 50 per cent of the total quantity of non-aqueous material but sufficient to effect proper emulsification, heating the mixture to about a pasteurizing temperature, homogenizing the mixture, and then atomizing the same to produce a shortening material in the form of a dry oleoferous powder containing about 50 to 90 per cent fat, the fat being in the form of minute globules each enclosed in an envelope of casein which has substantially the same chemical properties as the casein of normal milk but has improved film-forming properties and which serves to protect the fat from deteriorative agencies while being readily soluble, so that the fat is quickly released upon the addition of water to the material.

3. The improvement in the process of making a dry comminuted shortening material which consists in adding to an edible oil a milk of normal moisture content in an amount insufficient to reduce the fat content below about 50 per cent of the total quantity of non-aqueous material but sufficient to effect proper emulsification, heating the mixture to about a pasteurizing temperature, homogenizing the mixture, and then atomizing the same to produce a shortening material in the form of a dry oleo-ferous powder containing about 50 to 90 per cent fat, the fat being in the form of minute globules each enclosed in an envelope of casein which has substantially the same chemical properties as the casein of normal milk but has improved film-forming properties and which serves to protect the fat from deteriorative agencies while being readily soluble, so that the fat is quickly released upon the addition of water to the material, said process being so conducted that the moisture content of the material is substantially maintained up to the drying operation.

EDWARD K. CHAPIN.